United States Patent Office 3,733,319
Patented May 15, 1973

3,733,319
NITROTHIOPHENES
David W. Henry and William T. Colwell, Jr., Menlo Park, Calif., assignors to the United States of America as represented by the Secretary of the Army
No Drawing. Filed Jan. 7, 1970, Ser. No. 1,301
Int. Cl. C07d 63/12; A61k 27/00
U.S. Cl. 260—240 A                2 Claims

ABSTRACT OF THE DISCLOSURE

The disclosure describes eighteen analogs of 5-nitrothiophene 2-carboxaldehyde. The compounds are useful in the prevention and treatment of malaria.

The invention herein described was made in the course of or under a contract or subcontract thereunder with the Department of the Army.

BACKGROUND OF THE INVENTION (1) Field of the invention

This invention relates to analogs of 5-nitrothiophene-2-carboxaldehyde useful in the prevention and treatment of malaria. More specifically, it relates to fourteen new antimalarial compounds, 5-nitrothiophene-2-carboxaldehyde formhydrazone,
5-nitrothiophene-2-carboxaldehyde acethydrazone,
5-nitrothiophene-2-carboxhydrazone propionhydrazone,
5-nitrothiophene-2-carboxaldehyde isobutyrhydrazone,
5-nitrothiophene-2-carboxaldehyde valerhydrazone,
5-nitrothiophene-2-carboxaldehyde pivalhydrazone,
5-nitrothiophene-2-carboxaldehyde cyclohexanecarboxhydrazone,
5-nitrothiophene-2-carboxaldehyde n-octanohydrazone,
5-nitrothiophene-2-carboxaldehyde 1-adamantylcarboxhydrazone,
5-nitrothiophene-2-carboxaldehyde glycolohydrazone,
5-nitrothiophene-2-carboxaldehyde 4-hydroxybutyrhydrazone,
2-(5'-nitro-2'-thienylmethylidenehydrazino)acetamide,
2-[1'-acetyl-2-(5-nitro-2-thienylmethylidene)hydrazino] acetamide,
and 5-nitrothiophene-2-carboxaldehyde azine, and it also relates to the discovery of antimalarial activity in four old compounds, 5-nitrothiophene-2-carboxylic acid,
methyl 5-nitrothiophene-2-carboxylate,
5-nitrothiophene-2-carboxaldehyde isonicotinhydrazone,
and 1-(5-nitro-2-thienylideneamino)piperidine.

(2) Description of the prior art

Malaria is one of the most widespread of all human diseases; it has been estimated that over 200 million people are afflicted and over a million die each year from malaria. Furthermore, contrary to popular belief, malaria is not confined to the tropical and subtropical regions; outbreaks have occurred almost as far north as the Arctic Circle and to a corresponding latitude south. It is a protozoan disease caused by several species of the genus Plasmodium which forms one of the families of the suborder Haemsporida. Plasmodium vivax and Plasmodium falciparum are the most common species causing malaria in humans.

A number of antimalarial compounds have been prepared in the prior art, see for example the antimalarial section in Remington's Pharmaceutical Sciences, 13th edition (1965), p. 1302–1306. Recently, however, the prior art antimalarials have proved to be ineffective in specific cases in various parts of the world. The World Health Organization Technical Report No. 296 (1965), entitled, "Resistance of Malaria Parasites to Drugs," reports the following cases of drug resistance: quinine sulfate failed completely against strains of Plasmodium falciparum from New Guinea; chloroquine, amodiaquine, mepacrine, pyrimethamine and proguanil gave poor results against Plasmodium falciparum from Thailand; chloroquine, mepacrine, pyrimethamine and proguanil were ineffective against Plasmodium falciparum from Cambodia; Plasmodium falciparum from Vietnam proved resistant to chloroquine; and chloroquine gave poor results against malaria in Malaya. Further instances of drug resistant malaria may be seen in L. Bruce-Chwatt, Trans. Roy. Soc. Trop. Med. Hyg. 59, 105–144 (1965), in L. Legters et al., Military Med. 130, 168–176 (1965), and in A. Bourke et al., Trans. Roy. Soc. Trop. Med. Hyg. 60, 225–230 (1966).

The only conclusion to be drawn from these reports is that there exists a great need for new antimalarial drugs.

Three of the compounds in this invention are known in the prior art. The compounds 5-nitrothiophene-2-carboxylic acid and methyl 5-nitrothiophene-2-carboxylate are described in T. M. Patrick, Jr., et al. J. Amer. Chem. Soc. 74, 1356 (1952) but no utility is disclosed for the compounds. O. Umezawa et al., Yakugaku Kenkyu 35(7) pp. 256–63 (1963) (Japan), Chem. Abstr., 64: 2450h (1966), report modest activity for methyl 5-nitrothiophene-2-carboxylate against S. aureus. There is a great deal of biological data reported by various authors on 5-nitrothiophene-2-carboxylic acid and ethyl-5-nitrothiophene-2-carboxylate, but no teaching of antimalarial utility. The compound 1-(5-nitro-2-thienylideneamino) piperidine is disclosed in German Auslegeschrift No. 1,063,601, published Aug. 20, 1959, where the compound is noted for its fungicidal property.

SUMMARY OF THE INVENTION

This invention comprises the preparation of fifteen new analogs of 5-nitrothiophene-2-carboxaldehyde and the discovery that these fifteen new compositions of matter are effective antimalarials. The invention also comprises the discovery of antimalarial activity in four analogs of 5-nitrothiophene-2-carboxaldehyde that are old in the chemical art, but which were not known to possess antimalarial activity.

These eighteen compounds have shown significant activity for the prevention and treatment of malaria in laboratory evaluation tests. The compounds show antimalarial activity that is not anticipated by the prior art and that is completely unexpected.

Accordingly, it is an object of this invention to prepare new compositions of matter that are analogs of 5-nitrothiophene-2-carboxaldehyde.

Another object of this invention is to prepare new compositions of matter that are analogs of 5-nitrothiophene-2-carboxaldehyde and that possess antimalarial activity.

Another object of this invention is to provide antimalarial activity in known analogs of 5-nitrothiophene-2-carboxaldehyde.

A further object of this invention is to provide new processes for the prevention and treatment of malaria in mammals, and particularly in humans, wherein the active ingredients are analogs of 5-nitrothiophene-2-carboxaldehyde.

Finally, it is an object of this invention to prepare new compositions of matter and to provide new processes that will be useful in treating and preventing drug resistant malaria.

DESCRIPTION OF THE PREFERRED EMBODIMENTS

The following examples illustrate the preparation of the 5-nitrothiophene - 2 - carboxaldehyde analogs which comprise this invention:

EXAMPLE 1

Preparation of 5-nitrothiophene-2-carboxaldehyde formhydrazone

The first step in the preparation of 5-nitrothiophene-2-carboxaldehyde formhydrazone was to prepare the intermediate, 5-nitrothiophene-2-carboxaldehyde. The procedure of T. Patrick, Jr., et al. in J. Amer. Chem. Soc. 74, 1356 (1952) for the preparation 5-nitro-2-thiophenealdehyde diacetate was followed; however, distillation of the crude diacetate pyrolyzed it and 5-nitrothiophene-2-carboxaldehyde, our desired intermediate, was obtained directly. The fraction distilling at 125–130° C. (2 mm.) was crystallized from ethyl alcohol to give light yellow needles of 5-nitrothiophene-2-carboxaldehyde, melting at 70–75° C. The melting point compared favorably with the melting point of 75–76° C. reported by Patrick, Jr., et al., supra.

An infrared spectrum analysis gave the following results:

$$\lambda_{max.}^{Nujol} = 5.95\mu \text{ and } 6.0\mu \text{ (C=O functional group)};$$

$6.6\mu$ and $7.4\mu$ (NO$_2$ functional group).

An analysis using nuclear magnetic resonance (in CDCl$_3$) gave these results: $\tau$ 0.72 (singlet, 1H), 1.82 (doublet, 1H, J=5 cps.), 2.21 (doublet, 1H, J=5 cps.).

The next step in preparing the desired end-product was to dissolve 3.0 g. (0.019 mole) of the intermediate, 5-nitrothiophene-2-carboxaldehyde, in 50 ml. of tetrahydrofuran and then to add 1.2 g. (0.020 mole) of formhydrazide dissolved in 60 ml. of tetrahydrofuran. The reaction mixture was heated for 2½ hours on a steam bath and then stirred overnight at room temperature. After cooling in ice, the solid, pure end-product, 5-nitrothiophene-2-carboxaldehyde formhydrazone, was collected by filtration. A second crop was obtained by removing the solvent from the mother liquors and crystallizing the residue from ethyl alcohol. The total yield was 1.19 g. (31% yield), with melting point of 241–243° C.

An elemental analysis gave these results:

*Analysis.*—Calcd. for C$_6$H$_5$N$_3$O$_3$S (percent): C, 36.2; H, 2.51; N, 21.1. Found (percent): C, 36.5; H, 2.69; N, 20.8.

EXAMPLE 2

Preparation of 5-nitrothiophene-2-carboxaldehyde acethydrazone

The first step in the preparation of 5-nitrothiophene-2-carboxaldehyde acethydrazone was to prepare the intermediate, 5-nitrothiophene - 2 - carboxaldehyde, by the method employed in Example 1, supra.

The next step was to combine at reflux 1.43 g. (0.009 mole) of the intermediate 5-nitrothiophene-2-carboxaldehyde dissolved in 20 ml. absolute ethyl alcohol and 0.67 g. (0.009 mole) of acethydrazide dissolved in 20 ml. absolute ethyl alcohol. Several drops of 0.1 N HCl were added and the volume of solution was reduced under nitrogen to 25 ml. by boiling. The reaction mixture was stirred two days at room temperature. The desired end product was obtained in a 95% yield (1.82 g.) as yellow crystals from ethyl alcohol, with melting point 222–224° C.

An elemental analysis gave these results:

*Analysis.*—Calcd. for C$_7$H$_7$N$_3$O$_3$S (percent): C, 39.4; H, 3.31; N, 19.7. Found (percent): C, 39.2; H, 3.18; N, 19.9.

An infrared spectrum analysis showed $$\lambda_{max.}^{Nujol} = 5.98\mu \text{ (C=O group)}.$$

EXAMPLE 3

Preparation of 5-nitrothiophene-2-carboxaldehyde propionhydrazone

The first step in the preparation of 5-nitrothiophene-2-carboxaldehyde propionhydrazone was to prepare the intermediate, propionhydrazide, by the method of L. Horner et al. given in Chem. Ber., 94, p. 712 (1961); Chem. Abstr., 55, 14359h.

The next step in the preparation was to add 1.64 g. (0.019) mole) of propionhydrazide in 10 ml. of tetrahydrofuran to a solution of 2.66 g. (0.017 mole) of the intermediate 5-nitrothiophene - 2 - carboxaldehyde (prepared as described in Example 1) in 90 ml. of tetrahydrofuran. The solution was treated with 4 drops of 0.1 N HCl and refluxed for 2 hours. The reaction was cooled and the solvent removed in vacuo. The resulting solid was triturated with methanol and collected by filtration to yield 1.00 g. (26% yield) of the desired end product, 5 - nitrothiophene - 2 - carboxaldehyde propionhydrazone, melting point 205–209° C.

An elemental analysis gave the following results:

*Analysis.*—Calcd. for C$_8$H$_9$N$_3$O$_3$S (percent): C, 42.3; H, 3.96; N, 18.5. Found (percent): C, 42.5; H, 3.95; N, 18.7.

An infrared spectrum analysis gave $$\lambda_{max.}^{Nujol} = 6.0\mu \text{ (C=O group)}.$$

EXAMPLE 4

Preparation of 5-nitrothiophene-2-carboxaldehyde isobutyrhydrazone

The first step in the preparation of 5-nitrothiophene-2-carboxaldehyde isobutyrhydrazone was to prepare the intermediate, isobutyrhydrazide, by the method of L. Horner et al. given in Chem. Ber., 94, p. 712 (1961); Chem. Abstr., 55: 14359h as reported by T. Curtius et al., J. Prakt. Chem., 125:152 (1930), Chem. Abstr., 24:3217.

The next step in the preparation was to add 2.58 g. (0.020 mole) of isobutyrhydrazide in 10 ml. of tetrahydrofuran to a solution of 3.0 g. (0.019 mole) of 5-nitrophene-2-carboxaldehyde (the intermediate synthesized in Example 1) in 90 ml. of tetrahydrofuran. The solution was treated with 4 drops of 0.1 N HCl and refluxed for 2 hours. The reaction was cooled and the solvent removed in vacuo. The resulting solid was triturated with methanol and collected by filtration to yield 2.48 g. (54% yield) of the desired end product, 5-nitrothiophene-2-carboxaldehyde isobutyrhydrazone, melting point 233–237° C.

An elemental analysis gave the following results:

*Analysis.*—Calcd. for C$_9$H$_{11}$N$_3$O$_3$S (percent): C, 44.8; H, 4.57; N, 17.4. Found: (percent): C, 45.0; H, 4.54; N, 17.5.

An infrared spectrum analysis gave $$\lambda_{max.}^{Nujol} = 5.99\mu \text{ (C=O group)}$$

EXAMPLE 5

Preparation of 5-nitrothiophene-2-carboxaldehyde valerhydrazone

The first step in the preparation of 5-nitrothiophene-2-carboxaldehyde valerhydrazone was to prepare the intermediate, valerhydrazide, by the method of N.

Makhnenko et al. given in Zhur. Priklad. Khim. 32:449 (1959); Chem. Abstr., 53:13084c.

The next step in the preparation was to add 2.32 g. (0.020 mole) of valerhydrazide in 10 ml. of tetrahydrofuran to a solution of 3.0 g. (0.019 mole) of 5-nitrothiophene-2-carboxaldehyde (the intermediate synthesized in Example 1) in 90 ml. of tetrahydrofuran. The solution was treated with 4 drops of 0.1 N HCl and refluxed for 2 hours. The reaction was cooled and the solvent removed in vacuo. The resulting solid was triturated with methanol and collected by filtration to yield 1.85 g. (38% yield) of the desired end product, 5-nitrothiophene-2-carboxaldehyde valerhydrazone, melting point 203–204° C.

An elemental analysis gave the following results:

Analysis.—Calcd. for $C_{10}H_{13}N_3O_3S$ (percent): C, 47.1; H, 5.10; N, 16.5. Found (percent): C, 47.3; H, 5.25; N, 16.3.

An infrared spectrum analysis gave $$\lambda_{max}^{Nujol} = 5.97\mu \text{ (C=O group)}.$$

EXAMPLE 6

Preparation of 5-nitrothiophene-2-carboxaldehyde pivalhydrazone

Into 45 ml. of tetrahydrofuran was added 2.0 g. (0.013 mole) of 5 - nitrothiophene - 2 - carboxaldehyde, prepared as in Example 1, and 1.62 g. (0.0140 mole) of pivalhydrazide, prepared according to the method in Swiss Pat. 373,400 (1964) and in Chem. Abstr. 61, P 5522 b. The mixture was refluxed for 2 hours then cooled and filtered to give 1.75 g. (54% yield) of the desired end-product, 5 - nitrothiophene - 2 - carboxaldehyde pivalhydrazone, melting point 201–204° C.

An elemental analysis gave these results:

Analysis.—Calcd. for $C_{10}H_{13}N_3O_3S$ (percent): C, 47.1; H, 5.10; N, 16.5. Found (percent): C, 47.2; H, 5.24; N, 16.1.

EXAMPLE 7

Preparation of 5-nitrothiophene-2-carboxaldehyde cyclohexanecarboxhydrazone

The first step in the preparation of the desired end-product, 5 - nitrothiophene - 2 - carboxaldehyde cyclohexanecarboxhydrazone, was to prepare at least 3.0 gram of the intermediate 5 - nitrothiophene - 2 - carboxaldehyde, prepared as in Example 1. The preparation of another intermediate, cyclohexanecarboxyhydrazide, was also required at this point, so it was prepared according to the method of W. B. Martin et al. in U.S. Pat. 2,928,875, issued Mar. 15, 1960, and in Chem. Abstr. 54P: 15271 h.

These two intermediates were now reacted as follows: 2.82 g. (0.20 mole) of cyclohexanecarboxyhydrazide in 60 ml. of tetrahydrofuran was added to 3.0 g. (0.019 mole) of 5 - nitrothiophene - 2 - carboxaldehyde dissolved in 50 ml. of tetrahydrofuran. Two drops of 0.1 N HCl were added and the solution was refluxed for 3 hours. The volume of solvent was reduced using a nitrogen stream and the resulting precipitate of the desired end-product, 5 - nitrothiophene - 2 - carboxaldehyde cyclohexanecarboxyhydrazone, was collected by filtration to give 3.15 g. (67% yield). The product is a yellow solid with melting point 193–195° C.

An elemental analysis gave these results:

Analysis.—Calcd. for $C_{12}H_{15}N_3O_3S$ (percent): C, 51.4; H, 5.34; N, 15.0. Found (percent): C, 51.4; H, 5.45; N, 14.7.

EXAMPLE 8

Preparation of 5-nitrothiophene-2-carboxaldehyde n-octanohydrazone

To 50 ml. of tetrahydrofuran was added 3.0 g. (0.019 mole) of 5 - nitrothiophene - 2 - carboxaldehyde, prepared as in Example 1, and 3.32 g. (0.0210 mole) of n-octanohydrazide, prepared according to K. Pajari in Fette, Seifen, Anstrichmittel, 51, 347 (1944) and Chem. Abstr. 44, 7764 g. The solution was refluxed for 3 days and maintained at room temperature for 1 day. The solvent was then removed and the residue recrystallized from ethyl alcohol to give 1.77 g. (31% yield) of the end-product, 5-nitrothiophene - 2 - carboxaldehyde n-octanohydrazone, a green solid, melting point 108–112° C.

An elemental analysis gave these results:

Analysis.—Calcd. for $C_{13}H_{19}N_3O_3S$ (percent): C, 52.6; H, 6.40; N, 14.1. Found (percent): C, 52.4; H, 6.23; N, 14.3.

EXAMPLE 9

Preparation of 5-nitrothiophene-2-carboxaldehyde 1-adamantylcarboxhydrazone

To 80 ml. of tetrahydrofuran was added 3.0 g. (0.019 mole) of 5-nitrothiophene - 2 - carboxaldehyde, prepared as in Example 1, and 4.10 g. (0.0210 mole) of 1-adamantylcarboxhydrazide, prepared as described by H. Stetter et al. in Chem. Ber. 93, 1161 (1960). This mixture was refluxed overnight, cooled in ice and the precipitated product was collected by filtration. Purification was effected by repeated recrystallization from terahydrofuran. The yield of 5 - nitrothiopene - 2 - carboxaldehyde 1 - adamantylcarboxhydrazone was 2.45 g. (39% yield) of yellow solid, melting point 233–235° C.

An elemental analysis gave these results:

Analysis.—Calcd. for $C_{16}H_{19}N_3O_3S$ (percent): C, 57.7; H, 5.72; N, 12.6. Found (percent): C, 57.7; H, 5.95; N, 12.6.

EXAMPLE 10

Preparation of 5-nitrothiophene-2-carboxaldehyde isonicotinhydrazone

Into 40 ml. of tetrahydrofuran was placed 2.0 g. (0.013 mole) of 5 - nitrothiophene - 2 - carboxaldehyde, prepared as in Example 1, and 1.92 g. (0.0140 mole) of isonicotinhydrazide. The reaction mixture was warmed gently on a steam bath for two days, cooled and filtered to give 3.03 g. (86% yield) of 5 - nitrothiopene - 2 - carboxaldehyde isonicotinhydrazone, a yellow solid, melting point, 256–260° C. We have found 5 - nitrothiophene - 2 - carboxaldehyde isonicotinhydrazone mentioned in Chem. Abstr., 49:319b(1955) where the melting point is given as 247° C. The compound was presumably tested against M. tuberculosis.

An elemental analysis gave these results:

Analysis.—Calcd. for $C_{11}H_8N_4O_3S$ (percent): C, 47.8; H, 2.90; N, 20.3. Found (percent): C, 48.1; H, 3.06; N, 20.3.

EXAMPLE 11

Preparation of 5-nitrothiophene-2-carboxaldehyde glycolohydrazone

Into a flask was placed 45 ml. of tetrahydrofuran, 3 drops of 0.1 N HCl, 2.50 g. (0.016 mole) of 5-nitrothiophene-2-carboxaldehyde, prepared as in Example 1, and 1.58 g. (0.018 mole) of glycolohydrazide, prepared by the method of M. Rink et al., Arch. Pharm. 299, 254 (1966) and Chem. Abstr. 64, 17602 d. The reaction mixture was refluxed for two hours. The solvent was then removed in vacuo. The collected solid was recrystallized ethyl alcohol to leave 2.67 g. (73% yield) of the end-product, 5-nitrothiophene - 2 - carboxaldehyde glycolohydrazone, melting point 190–195° C.

An elemental analysis gave these results:

Analysis.—Calcd. for $C_7H_7N_3O_4S$ (percent): C, 36.7; H, 3.06; N, 18.4. Found (percent): C, 36.8; N, 3.31; N, 18.5.

EXAMPLE 12

Preparation of 5-nitrothiophene-2-carboxaldehyde 4'-hydroxybutyrhydrazone

Into a flask was placed 45 ml. of tetrahydrofuran, 3 drops of 0.1 N HCl, 2.00 g. (0.0127 mole) of 5-nitrothiophene-2-carboxaldehyde, prepared as in Example 1, and 1.65 g. (0.0140 mole) of 4-hydroxybutyrhydrazide, prepared by the method of R. Huisgen et al. in Chem. Ber. 98, 1138 (1965). The end-product began to precipitate immediately but the flask was warmed briefly and stirred for two days. The mixture was cooled in ice and filtered. The precipitate was triturated in diethyl ether and ethyl alcohol to leave 2.94 g. (93% yield) of the end-product, 5-nitrothiophene-2-carboxaldehyde 4' - hydroxybutyrhydrazone, melting point 203–206° C.

An elemental analysis gave these results:

Analysis.—Calcd. for $C_9H_{11}N_3O_4S$ (percent): C, 42.1; H, 4.32; N, 16.4. Found (percent): C, 42.3; H, 4.44; N, 16.4.

EXAMPLE 13

Preparation of 2-(5'-nitro-2'-thienylmethylidenehydrazino)acetamide

The desired acetamide was prepared by the procedure of F. Ebetino et al. in J. Med. Chem., 6, p. 633 (1963) used by Ebetino et al. to prepare the corresponding nitrofuran compound. Using this procedure, 2.08 g. (55% yield) of 2-(5'-nitro-2'-thienylmethylidenehydrazino)acetamide was synthesized, melting point 166–168° C.

An elemental analysis gave the following results:

Analysis.—Calcd. for $C_7H_8N_4O_3S$ (percent): C, 36.9; H, 3.51; N, 24.6. Found (percent): C, 36.9; H, 3.56; N, 24.6.

An infrared spectrum analysis gave $\lambda_{max.}^{Nujol} = 5.98\mu$ (C=O group) and $6.09\mu$ (C=N group).

EXAMPLE 14

Preparation of 2-[1'-acetyl-2'-(5-nitro-2-thienylmethylidene)hydrazino]acetamide The first step in the preparation of this product was to prepare as an intermediate the compound 2-(5'-nitro-2'-thienylmethylidenehydrazino)acetamide synthesized in Example 13, supra.

The next step was to heat at reflux temperature for 2 hours a mixture of 48 ml. of acetic anhydride and 5.46 g. (0.01 mole) of the intermediate 2-(5'-nitro-2'-thienylmethylidenehydrazino)acetamide. The reaction mixture was cooled to room temperature and the precipitated solid was collected by filtration and washed with ether. A yield of 18% (1.19 g.) of the desired end product 2-[1'-acetyl-2'-(5-nitro - 2 - thienylmethylidene)hydrazino]acetamide was obtained, melting point 230–252° C.

An elemental analysis gave these results:

Analysis.—Calcd. for $C_9H_{10}N_4O_4S$ (percent): C, 40.0; H, 3.71; N, 20.7. Found (percent): C, 39.9; H, 3.69; N, 20.5.

EXAMPLE 15

Preparation of 5-nitrothiophene-2-carboxaldehyde azine

To 50 ml. of tetrahydrofuran was added 3.0 g. (0.019 mole) of 5-nitrothiophene-2-carboxaldehyde, prepared as in Example 1, and 0.336 g. (0.0105 mole) of hydrazine hydrate. The reaction solution was refluxed for two hours and filtered to give 1.21 g. (32% yield) of 5-nitrothiophene-2-carboxaldehyde azine, a yellow product, melting point 215–217° C.

An elemental analysis gave these results:

Analysis.—Calcd. for $C_{10}H_6N_4O_4S_2$ (percent): C, 38.7; H, 1.94; N, 18.0. Found (percent): C, 39.1; H, 2.07, N, 17.7.

EXAMPLE 16

Preparation of 5-nitrothiophene-2-carboxylic acid

The first step in the preparation of 5-nitrothiophene-2-carboxylic acid was to prepare the intermediate, 5-nitrothiophene-2-carboxaldehyde, as in Example 1. The next step in the preparation of the desired end product, 5-nitrothiophene-2-carboxylic acid, was to add 91.6 ml. of a chromic acid solution to a mixture of 21.8 g. (0.139 mole) of the intermediate, 5-nitrothiophene-2-carboxaldehyde, and 146 ml. of 50% aqueous acetone. (The chromic acid solution was made by adding 200 g. of chromium trioxide to 333 ml. of sulfuric acid and diluting with water to 1 liter.) Mixing resulted in evolution of heat and complete solution of the aldehyde. After stirring 3 hours at room temperature, the product was collected by filtration as a white solid (20.2 g., 85% yield), melting point 159–160° C. This compared favorably with the melting point of 158° C. reported by P. Fournari et al. in Bull. Soc. Chim. France, p. 479 (1963).

EXAMPLE 17

Preparation of methyl 5-nitrothiophene-2-carboxylate

This product was prepared by Fischer esterification (methanol with concentrated sulfuric acid) of 3.0 g. (17.4 mmoles) of 5-nitrothiophene-2-carboxylic acid, prepared according to Example 16. A yield of 44% (1.4 g.) of methyl 5-nitrothiophene-2-carboxylate was obtained, melting point 60–63.5° C. P. Fournari et al. reported a melting point of 75° C. in Bull. Soc. Chim. France, 479 (1963). Another preparation identical to the above gave methyl 5-nitrothiophene-2-carboxylate with a melting point of 69.5–71° C. (74% yield). The biological test material gave a correct elemental analysis for C, H, and N.

An infrared spectrum analysis gave $\lambda_{max.}^{Nujol} = 5.75$ and $5.83\mu$ (split C=O).

EXAMPLE 18

Preparation of 1-(5-nitro-2-thienylideneamino) piperidine

To 45 ml. of tetrahydrofuran containing 3 drops of 0.1 N HCl was added 2.5 g. (0.016 mole) of 5-nitrothiophene-2-carboxaldehyde, prepared as in Example 1, and 1.75 g. (0.0175 mole) of 1-aminopiperidine. The mixture was refluxed for 2 hours and stirred at room temperature for 48 hours. Removal of the solvent in vacuo and crystallization of the residue from ethyl alcohol gave 3.11 g. (82% yield) of red, crystalline 1-(5-nitro-2-thienylideneamino) piperidine, melting point 125–129° C.

An elemental analysis gave these results:

Analysis.—Calcd. for $C_{10}H_{13}N_3O_2S$ (percent): C, 50.3; H, 5.44; N, 17.6. Found (percent): C, 50.3; H, 5.60; N, 17.3.

ANTIMALARIAL UTILITY

The eighteen compounds prepared in the above examples show unexpected and unobvious antimalarial activity. This fact can be seen in the following table which gives the results of antimalarial evaluations using the Walter Reed Army Institute of Research primary mouse screen test on a series of analogs of 5-nitrothiophene-2-carboxaldehyde.

ANTIMALARIAL EVALUATION OF 5-NITROTHIOPHENE-2-CARBOXALDEHYDE ANALOGS

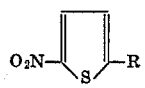

| Example | R | Antimalarial bioassay results [1] with— | | | | | |
|---|---|---|---|---|---|---|---|
| | | 20 [2] | 40 [2] | 80 [2] | 160 [2] | 320 [2] | 640 [2] |
| 1 | —CH=NNHCHO | 1.1 | 1.1 | 1.3 | 1.7 | 3.9 | 7.3 |
| 2 | —CH=NNHCOCH₃ | — | 1.3 | — | 1.7 | — | 5.1 |
| | | 0.3 | 0.7 | 1.1 | 1.9 | 4.1 | 4.3 |
| | | | | | | 5.2 | 5.6 |
| 3 | —CH=NNHCOCH₂CH₃ | — | 0.3 | — | 2.1 | — | 5.7 |
| | | 0.2 | 0.4 | 1.0 | 1.2 | 3.0 | 4.8 |
| 4 | —CH=NNHCOCH(CH₃)₂ | — | 0.7 | — | 1.9 | — | 5.5 |
| | | 0.2 | 0.6 | 0.6 | 2.0 | 3.8 | 5.0 |
| 5 | —CH=NNHCO(CH₂)₃CH₃ | — | 0.1 | — | 1.5 | — | 4.9 |
| | | 0.2 | 0.4 | 0.4 | 1.4 | 2.6 | 4.8 |
| 6 | —CH=NNHCOC(CH₃)₃ | — | — | — | 1.1 | 4.1 | 5.3 |
| | | 0.2 | 0.2 | 0.4 | 1.2 | 2.6 | 5.4 |
| 7 | —CH=NNHCO—⟨S⟩ | — | 1.1 | — | 3.7 | — | 5.7 |
| | | 0.0 | 0.2 | 0.2 | 3.0 | 5.0 | 5.6 |
| 8 | —CH=NNHCO(CH₂)₆CH₃ | — | 1.2 | — | 4.0 | — | 11.8 |
| | | 1.0 | 2.0 | 4.0 | 4.4 | 8.2 | 11.6 |
| 9 | —CH=NNHCO—(adamantyl) | 0.5 | 1.1 | 2.3 | 2.5 | 8.1 | 9.5 |
| 10 | —CH=NNHCO—⟨N⟩ | — | 1.8 | — | 5.8 | — | .92 |
| | | 3.3 | 3.3 | 5.7 | 5.7 | 7.7 | 9.5 |
| 11 | —CH=NNHCOCH₂OH | — | — | — | 2.9 | 3.5 | 5.7 |
| | | 0.2 | 0.2 | 0.4 | 0.6 | 4.0 | 5.8 |
| 12 | —CH=NNHCO(CH₂)₃OH | — | — | — | 0.3 | 0.9 | 4.9 |
| | | 0.4 | 0.6 | 1.0 | 1.2 | 1.6 | 4.0 |
| 13 | —CH=NNHCH₂CONH₂ | — | 0.3 | — | 0.7 | — | 5.4 1/5 |
| | | 0.2 | 0.2 | 0.8 | 1.0 | 1.6 | 5.8 2/5 |
| 14 | —CH=NN(COCH₃)CH₂CONH₂ | — | — | — | 0.9 | 2.7 | 3.9 |
| | | 0.2 | 0.2 | 0.2 | 0.4 | 1.8 | 4.8 |
| 15 | —CH=N—N=CH—⟨S⟩—NO₂ | — | 0.3 | — | 0.5 | — | 3.7 |
| | | 0.1 | 0.1 | 0.3 | 0.7 | 1.1 | 3.1 |
| 16 | —COOH | — | 1.0 | — | 3.2 | — | 7.6 |
| | | 0.1 | 1.1 | 3.3 | 3.5 | 4.9 | 7.7 |
| 17 | —COOCH₃ | — | 2.2 | — | 4.6 | — | 8.0 |
| | | 2.1 | 3.5 | 4.5 | 5.5 | 6.5 | 8.1 |
| 18 | —CH=NN⟨phenyl⟩ | — | — | — | 1.1 | 3.1 | 6.1 |
| | | 0.0 | 0.2 | 0.2 | 1.2 | 2.4 | 6.2 |

[1] Increase in survival time (in number of dayx) of treated mice beyond that of untreated controls after single subcutaneous dosages (3 days post-infection) of 20, 40, 80, 160, 320 and 640 mg. of drug per kg. of body weight. Average survival time of untreated mice: 6.5 ± 0.5 days. Infecting organism: *Plasmodium berghei*. Quinine gives values of approximately 1.0 at 40 mg./kg., 3.0 at 160 mg./kg. and 7.0 at 640 mg./kg. in this test. Fractions represent toxicity deaths over total mice in treated group. Drug toxicity is assumed to be the cause of death when treated mice die before untreated controls. A hyphen indicates tests were not run at this dosage. Five mice were used in each test run at a specific dosage level.

[2] Dosage in milligrams of drug per kilogram of mouse body weight.

In addition to the above antimalarial evaluation performed on mice, the new compound, 5-nitrothiophene-2-carboxaldehyde valerhydrazone (Example 5, supra) has been tested by oral administration in rhesus monkeys with the following results: (1) In trophozoite-induced *Plasmodium knowlesi*, 5 animals were given orally 100 milligrams/kilogram of body weight per day for 7 days and 3 monkeys survived. At an oral dosage of 50 milligrams/kilogram, there were no survivors among the 5 test animals. Among the 10 control animals, there were no survivors. (2) In trophozoite-induced *Plasmodium cynomolgi*, 2 rhesus monkeys were given orally 100 milligrams/kilogram of body weight per day for 7 days and there was 1 cure and 1 suppression. At an oral dosage of 31.6 milligrams/kilogram for 7 days, 2 test monkeys showed no positive effect from the drug. The oral toxicity of the compound was determined to be a maximum tolerated dose of 100 milligrams/kilogram of body weight per day for 7 days.

The antimalarial evaluation reported above reveals unexpected antimalarial activity in the eighteen compounds which comprise this invention.

Testing antimalarial compounds in humans is obviously too dangerous for the first step in the development of antimalarials. Thus, animal tests have conventionally been used to test antimalarial compounds and animal tests have led to the development of many of the antimalarial compounds now available such as quinacrine, chloroquine, pamaquine, and proguanil.

The Walter Reed Army Institute of Research uses the primary mouse screen with *Plasmodium berghei* for several reasons. One reason is that the Plasmodium species which cause malaria in humans (i.e., *Plasmodium falciparum* and *Plasmodium vivax*) cannot live in animals. Another reason is that *Plasmodium berghei* is regarded as a good model for human malaria. Finally, mice are easy to work with and the *Plasmodium berghei* infections show the same range of susceptiblity to a variety of known antimalarial drugs as other malaria parasites used for evaluating antimalarial compounds. See for example Bull. Soc. Pathol. Exotique 42, 449 (1949); Ann. Trop. Med. Parasitol. 44, 291 (1950); Brit. J. Pharmacol. 8, 162 (1953); Z. Tropenmed. U. Parasitol. 2, 471 (1951).

We claim:

1. 5-nitrothiophene - 2 - carboxaldehyde cyclohexanecarboxhydrazone.
2. 5-nitrothiophene-2 - carboxaldehyde 1 - adamantylcarboxhydrazone.

References Cited

UNITED STATES PATENTS

| | | | |
|---|---|---|---|
| 2,841,523 | 7/1958 | Gaertner | 167—33 |
| 2,416,236 | 2/1947 | Stillman | 260—345 |
| 3,026,332 | 3/1962 | Holland | 260—347.3 |
| 3,127,420 | 3/1964 | Ebetino | 260—347.3 |
| 3,141,892 | 7/1964 | Tweit | 260—329 |
| 3,147,270 | 9/1964 | Anderson | 260—296 |

FOREIGN PATENTS

| | | | |
|---|---|---|---|
| 905,459 | 9/1962 | Great Britain | 260—347.3 |

OTHER REFERENCES

Dann et al.; Chem. Ber. 82:76–92 (1949).

HENRY R. JILES, Primary Examiner

C. M. S. JAISLE, Assistant Examiner

U.S. Cl. X.R.

260—332.2 A, 332.2 C, 332.2 R; 424—263, 267, 275